United States Patent [19]
Winters

[11] 4,154,213
[45] May 15, 1979

[54] DUCTLESS FORCED-CIRCULATION UNDERCOUNTER FURNACE

[75] Inventor: Mellie E. Winters, Wichita, Kans.
[73] Assignee: The Coleman Company, Inc., Wichita, Kans.
[21] Appl. No.: 792,807
[22] Filed: May 2, 1977
[51] Int. Cl.² .............................................. F24H 3/10
[52] U.S. Cl. ................................. 126/110 B; 126/85 B
[58] Field of Search ............. 126/110 B, 116 B, 85 B, 126/61, 63, 66, 67, 110 R

[56] References Cited

U.S. PATENT DOCUMENTS

| | | | |
|---|---|---|---|
| 2,864,359 | 12/1958 | Vaughn | 126/110 B |
| 3,120,225 | 2/1964 | Stark et al. | 126/110 B |
| 3,267,928 | 8/1966 | Spooner | 126/110 B |
| 3,361,125 | 1/1968 | Hershey | 126/116 B |
| 3,384,070 | 5/1968 | Castello et al. | 126/110 B |
| 3,628,521 | 12/1971 | Hodges | 126/116 B X |
| 3,680,541 | 8/1972 | Honaker, Jr. | 126/116 B X |
| 3,916,870 | 11/1975 | Beavers | 126/110 B |

Primary Examiner—William E. Wayner
Assistant Examiner—William E. Tapolcai, Jr.
Attorney, Agent, or Firm—Tilton, Fallon, Lungmus & Chestnut

[57] ABSTRACT

A heat exchanger assembly for an undercounter furnace includes first and second complementary, flanged sidewalls shaped to provide a fire chamber. Integral lower combustion air intake and upper exhaust flue are formed from the same sheet metal as the sidewalls. The width of the fire chamber is less than its height and length. A circulating fan is located behind the fire chamber and between the intake and flue ducts, taking room air from the rear of the casing and forcing it forwardly to sweep over both sidewalls and into the room to be heated. The heat exchanger is mounted to a removable chassis.

8 Claims, 9 Drawing Figures

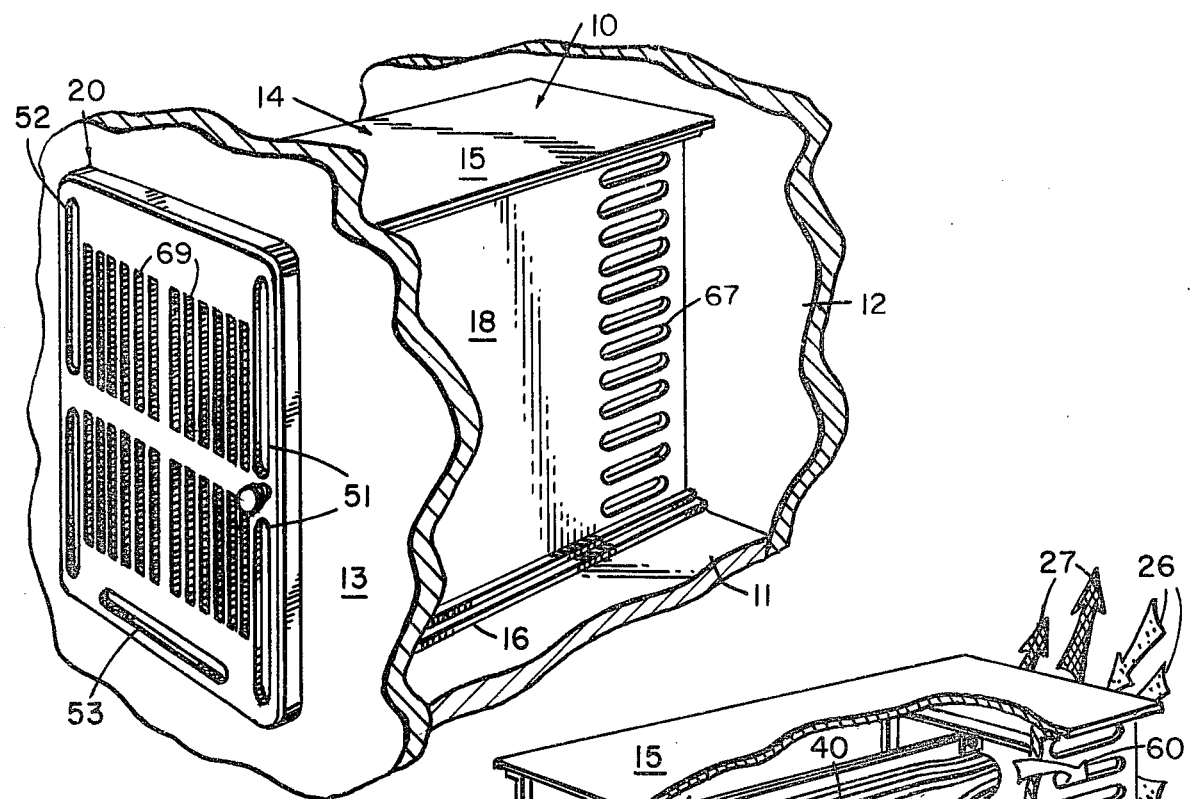
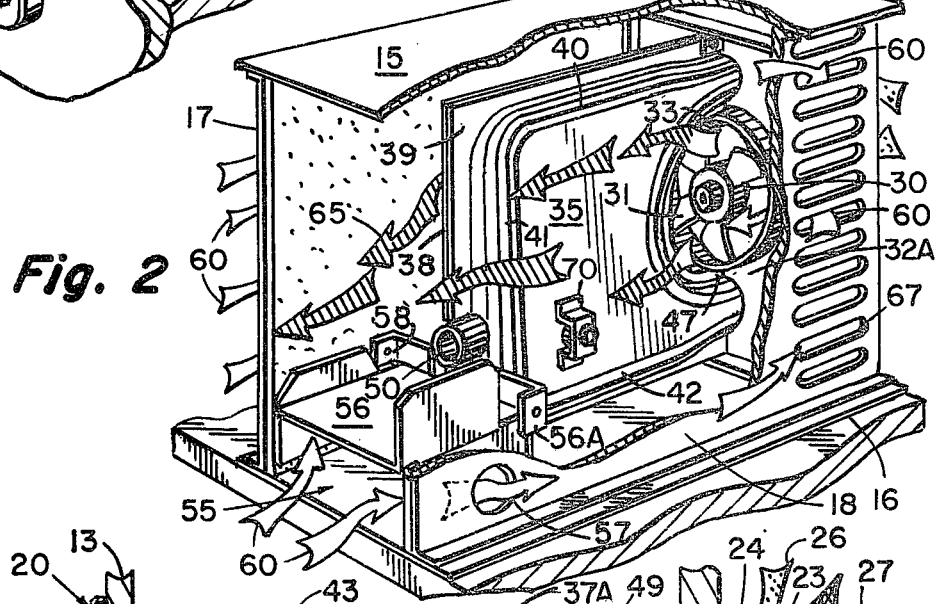
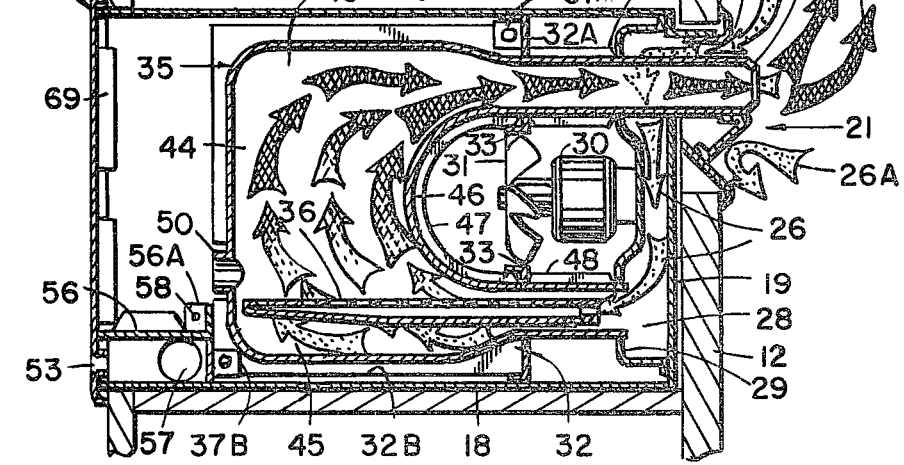

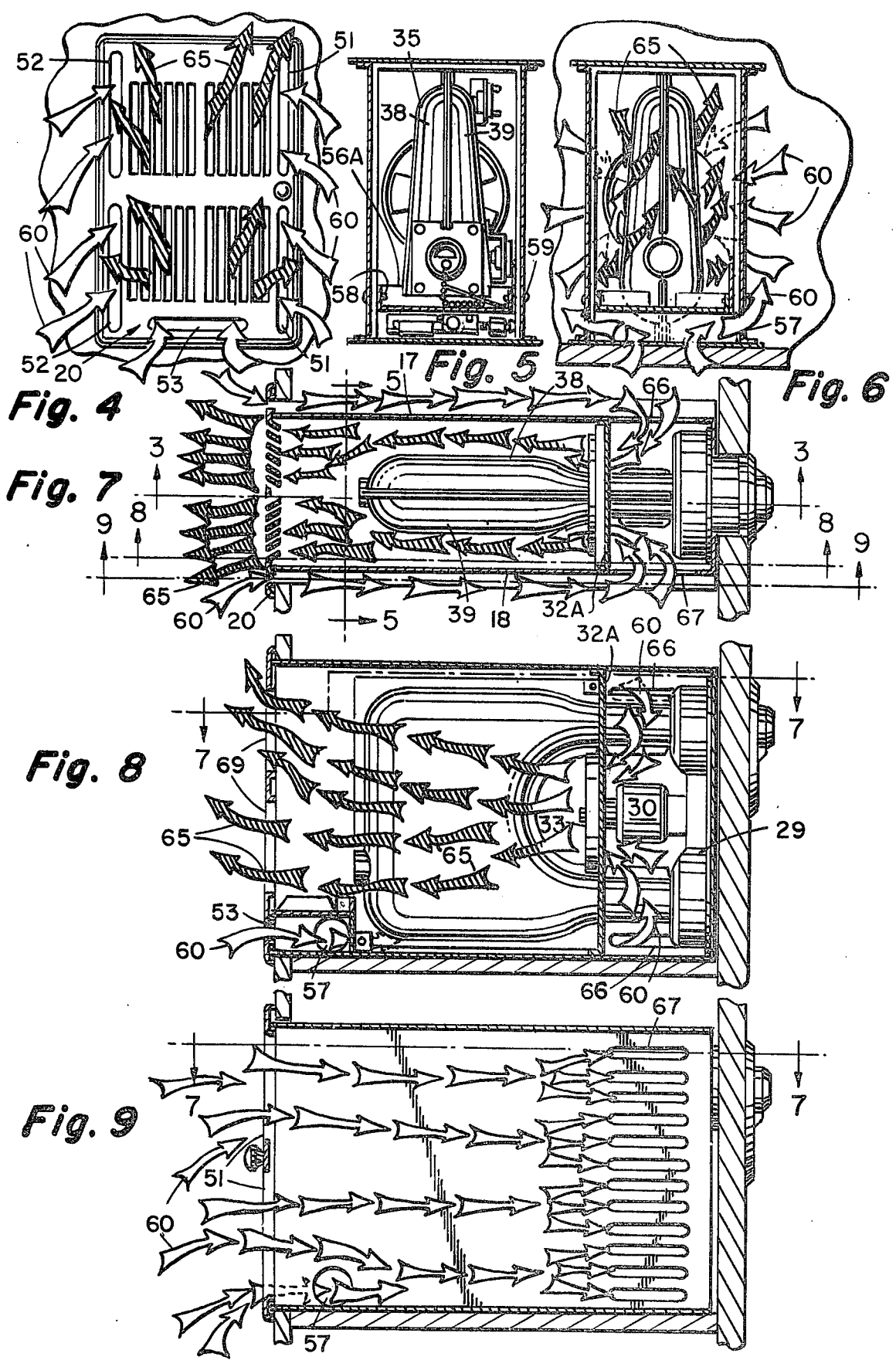

DUCTLESS FORCED-CIRCULATION UNDERCOUNTER FURNACE

BACKGROUND AND SUMMARY

The present invention relates to an improved gas furnace of the type which is suited for use in a recreational vehicle or similar environment. The furnace is gas-fired, uses gravity-fed (i.e., non-forced) through-the-wall combustion air, and employs a fan for circulating room air. No special ductwork is required for installation. Furnaces of this type are sometimes referred to as "undercounter" furnaces because they are designed to fit in small spaces such as are available beneath counter tops.

According to the present invention, a heat exchanger assembly for an undercounter furnace includes first and second complementary sidewalls made from sheet metal and shaped to provide a fire chamber. The sidewalls are mirror images of each other, and they are also shaped to provide an integral lower combustion air intake and upper exhaust flue. The sidewalls are flanged throughout their periphery so that they may be spot-welded together. In other words, the entire fire chamber, combustion air intake and exhaust are formed from two pieces of sheet metal. The heat exchanger is mounted on a removable chassis.

Adjacent the intake and exhaust conduits, the fire chamber is smoothly curved from the top of the combustion air intake to the bottom of the exhaust flue and the room air blower fan is located in the intermediate space between the combustion air intake and exhaust flue for forcing room air over both sides of the fire box, the width of which is less than its height and length. Thus, room air to be heated is uniformly swept across both sides of the fire box and then routed through a grille into the room to be heated.

A horizontal vent air terminal is provided on an outside wall adjacent the rear of the furnace; and as is conventional, the combustion air is taken in through an annular space about the exhaust flue which also extends through the air terminal. The combustion air is taken in through a vertical chamber at the rear of the furnace and routed to the lower combustion air intake leading to the fire box.

Room air to be heated is taken in through the bottom and sides of the grille and routed to the rear of the furnace where the fan forces it over the fire box. The fan is operated by a first heat sensing switch, and a second heat sensing switch limits the temperature of the discharged circulating room air to a maximum of 200° F.

Other features and advantages of the present invention will be apparent to persons skilled in the art from the following detailed description of a preferred embodiment accompanied by the attached drawing wherein identical reference numerals will refer to like elements in the various views.

THE DRAWING

FIG. 1 is an upper perspective view of an undercounter furnace incorporating the present invention with adjacent walls shown in fragmentary form;

FIG. 2 is a view similar to FIG. 1 with the walls and front grille removed and with a portion of the casing cut away to view the interior of the furnace;

FIG. 3 is a vertical longitudinal cross sectional view of the furnace of FIG. 1;

FIG. 4 is a front elevational view of the grille showing the circulation of room air;

FIG. 5 is a vertical cross sectional view behind the grille and taken through the sight line 5—5 of FIG. 7, also showing the circulation pattern for room air;

FIG. 6 is a view similar to FIG. 5 but with controls and gas feed removed to show the circulation of room air inside the casing;

FIG. 7 is a horizontal sectional view of the furnace taken through the sight line 6—6 of FIGS. 8 and 9 illustrating the circulation pattern for room air;

FIG. 8 is a vertical sectional view of the furnace taken through the sight line 8—8 of FIG. 7 illustrating the room air circulation pattern; and FIG. 9 is another vertical sectional view of the furnace taken through the sight line 9—9 of FIG. 7, illustrating the circulation pattern for room air along the side of the casing.

DETAILED DESCRIPTION

Referring now to FIG. 1, reference numeral 10 generally designates an undercounter furnace resting on a floor 11 between an outer wall 12 and a front wall 13. The furnace 10 has a metal outer casing 14 including a top 15, a bottom 16, first and second sidewalls 17 and 18, a rear wall 19 and a front grille generally designated 20 which is located exterior of the wall 13, see FIGS. 1 and 3.

Referring now particularly to FIGS. 2 and 3, combustion air is taken in and exhausted through a horizontal vent air terminal generally designated 21 in FIG. 3. The vent 21 is described in detail in U.S. Pat. No. 3,994,280, granted Dec. 2, 1976, for "Horizontal Vent Air Terminal for Sealed Combustion Furnaces". Briefly, it includes an exhaust flue 23 surrounded by an annular combustion air intake chamber 24, together with structure for reducing the effect of incident wind.

The fresh combustion air is diagrammatically illustrated by dotted arrows 26 and 26A, whereas the hot exhaust gases are indicated by the cross-hatched arrows 27. The fresh combustion air is routed from the annular opening 24 downwardly in a chamber 28 which is located between the rear wall 19 of the casing and a forward chamber wall member 29. Located in front of the chamber wall 29 is an electric motor 30 which drives a fan 31 for circulating room air, as will be described. The flow of combustion air, however, is not fan-forced, but rather, it is routed under gravity flow. A chassis 32 is formed from flanged sheet metal to provide a vertical separator wall 32A and a horizontal slide 32B. The separator wall 32A defines a central flanged opening 33 for the fan 31.

Located in front of the separator wall 32A and carried by the chassis 32 is a heat exchanger generally designated by reference numeral 35 in which a gas burner 36 is housed. The heat exchanger 35 is made from two formed pieces of sheet metal, designated 38 and 39 respectively and referred to as sidewalls because their major extension provides sidewalls for the heat exchanger.

Each of the sidewalls 38, 39 is complementary—that is, they form mirror images and fit together to form a sealed firebox. The top, front and bottom of each sidewall is curved inwardly of the heat exchanger as at 40, 41 and 42 for the sidewall 39, and the edges are flanged at 43, 44 and 45 for sealingly joining the sidewalls together by welding. At the rear of the heat exchanger, the sidewalls are also curved inwardly and curved vertically as at 46, and they are further flanged at 47 to provide a space for the fan 31. Beneath the fan, the sidewalls of the heat exchanger form a fresh air intake 48 of round cross section. The fresh air intake 48 extends through the separator wall 32A and is connected to the front chamber wall 29 for routing fresh combustion air to the burner 36. Similarly, above the fan 31, the sidewalls 38, 39 are formed to define an exhaust flue 49, also of round cross section. The exhaust flue 49 extends through the separator wall 32A and the front chamber wall 29, and is connected to the exhaust flue 23 of the vent air terminal 21.

A sight glass assembly 50 is located in the lower forward portion of the heat exchanger so that it can be readily determined whether the pilot light is lit.

The heat exchanger 35 is secured to the chassis 32 by means of first and second brackets 37A and 37B welded respectively to the vertical separator wall 32A and slide 32B, and secured respectively to the flanges 43 and 45 of the firebox by means of sheet metal screws.

Operation

Room air to be heated and circulated is taken in through the grille 20 via side slots 51 and 52 as well as a lower slot 53. The slots 51 and 52 communicate room air to spaces outside of the sidewalls 17, 18. It will be observed that the top 15 and bottom 16 overhang the sidewalls of the casing, thereby providing side passages for routing room air to be heated.

The bottom slot 53 in the grille 20 communicates with a lower chamber designated 55 in FIG. 2 and defined by the sidewalls 17, 18, the bottom 16, and an upper horizontal separator plate 56. This air is routed through apertures in the sidewalls, one of which is designated 57 in FIG. 2, into the previously described side passages for room air, see FIGS. 4 and 5 wherein room air to be heated is diagrammatically illustrated by the clear arrows 60. This room air is forced by the fan 31 through the opening 33 in the partition 32 and over the sidewalls 38, 39 of the heat exchanger 35, the heated room air being diagrammatically illustrated by the lined arrows 65.

The room air enters into the space between the chamber 28 and the partition 32 by means of slots 66 and 67 located respectively in the rear portions of the sidewalls 17, 18. The heated air is then discharged into the room through the slots 69 on the front grille 20, as illustrated in FIGS. 4, 6 and 7.

The heat exchanger and chassis are held in the furnace by means of screws 58 and 59 (FIG. 5) which secure flanges 56A on the horizontal separator plate 56 to the sidewalls of the casing 14. The heat exchanger and chassis assembly can be completely removed by removing the screws 58, 59, disconnecting an electrical plug and disconnecting the gas.

A limit switch generally designated 70 in FIG. 2, and mounted to the sidewall of the heat exchanger 35 is set at 200° F. and used to close the gas solenoid in the event that temperature is reached, thereby limiting the temperature of air being discharged into the room. A second heat sensitive switch is used for controlling the motor 30 so that it does not circulate cold air, as is known.

Having thus described in detail a preferred embodiment of the invention, persons skilled in the art will be able to modify certain of the structure which has been disclosed and to substitute equivalent elements for those illustrated while continuing to practice the principle of the invention; and it is, therefore, intended that all such modifications and substitutions be covered as they are embraced within the spirit and scope of the appended claims.

I claim:

1. In a gas furnace adapted to be vented through an outside wall, the combination comprising a casing having a top, bottom, first and second sides and a rear wall adjacent said outside wall; a vent air terminal extending through said outside wall and including a combustion air inlet passage and an exhaust flue; means providing a chamber for combustion air adjacent said rear casing wall; a heat exchange in said casing formed from first and second sheet metal elements providing first and second heat exchanger sidewalls respectively spaced inwardly of said casing sidewalls to permit the passage of room air, said sheet metal elements having their edges turned toward each other and flanged for joining to provide a top, front and bottom of said heat exchanger, and further having their rear sections turned toward each other and flanged for joining, and providing an integral lower conduit for combustion air communicating with said combustion air chamber means, and further providing an integral upper flue conduit communicating with said exhaust flue of said air terminal; blower means in the rear of said casing between said heat exchanger and said combustion air chamber means for forcing room air to uniformly sweep both sides of said heat exchanger, and a partition extending transversely of said casing adjacent said blower means and between said combustion air chamber means and said heat exchanger to provide a room air intake chamber, the sides of said casing defining room air inlet slots adjacent said room air intake chamber, said blower means forcing air from said room air intake chamber forwardly over the sidewalls of said heat exchanger.

2. The apparatus of claim 1 wherein said lower and upper conduits of said heat exchanger are generally circular in cross section and extend through said partition, said lower conduit being directly connected to said combustion air chamber means and said upper conduit being directly connected to the exhaust flue of said vent air terminal.

3. The apparatus of claim 2 further comprising a grille attached to the front of said furnace and including a first set of openings for admitting incoming room air to be heated, and a second set of openings in front of said heat exchanger for permitting the discharge of heated room air.

4. The apparatus of claim 3 further comprising a horizontal separator element in front of said heat exchanger and extending between the sidewalls of said casing, room air being admitted beneath said separator wall and passing through apertures in the side casing walls.

5. The apparatus of claim 1 wherein the sidewalls of said heat exchanger are separated by a distance less than the length and depth of said heat exchanger, whereby room air to be heated may pass from said fan and uniformly sweep both sides of the heat exchanger.

6. In a gas furnace adapted to be vented through an outside wall, the combination comprising a casing having a top, bottom, first and second sides and a rear wall adjacent said outside wall; a vent air terminal extending through said outside wall and including a combustion air inlet passage and an exhaust flue; means providing a chamber for combustion air adjacent said rear casing wall; a heat exchanger in said casing formed from first and second sheet metal elements providing first and second heat exchanger sidewalls respectively spaced inwardly of said casing sidewalls to permit the passage of room air, said sheet metal elements having their edges turned toward each other and flanged for joining to provide a top, front and bottom of said heat exchanger, and further having their rear sections turned toward each other and flanged for joining, and providing an integral lower conduit for combustion air communicating with said combustion air chamber means, and further providing an integral upper flue conduit communicating with said exhaust flue of said air terminal; blower means in the rear of said casing between said heat exchanger and said combustion air chamber means for forcing room air to uniformly sweep both sides of said heat exchanger, and a chassis formed of sheet metal providing a vertical separator wall between said heat exchanger and said combustion air chamber means and a horizontal slide beneath said heat exchanger; and means for securing the peripheral flange of said heat exchanger to said chassis.

7. The apparatus of claim 6 further comprising a horizontal separator element in front of said heat exchanger and extending between the sidewalls of said casing and including upstanding side flanges adjacent said casing; means for attaching said flanges of said horizontal separator element to said casing; and a grille attached to the front of said furnace and including a first set of openings for admitting incoming room air to be heated and communicating beneath said horizontal separator element, and a second set of openings for permitting the heated room air to be discharged above said horizontal separator element.

8. The apparatus of claim 6 wherein said casing defines room air inlet openings communicating with the space between said vertical separator wall of said chassis and said fresh air chamber means.

* * * * *